United States Patent
Heo

(10) Patent No.: US 11,054,025 B2
(45) Date of Patent: Jul. 6, 2021

(54) JAMMING PROTECTION APPARATUS OF SHIFT LEVER FOR VEHICLE

(71) Applicants: Hyundai Motor Company, Seoul (KR); Kia Motors Corporation, Seoul (KR)

(72) Inventor: Jae Sung Heo, Uiwang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 97 days.

(21) Appl. No.: 16/284,290

(22) Filed: Feb. 25, 2019

(65) Prior Publication Data

US 2020/0149630 A1  May 14, 2020

(30) Foreign Application Priority Data

Nov. 14, 2018  (KR) .......................... 10-2018-0140161

(51) Int. Cl.
| | |
|---|---|
| *B60K 20/00* | (2006.01) |
| *G05G 9/00* | (2006.01) |
| *F16H 61/24* | (2006.01) |
| *F16H 59/10* | (2006.01) |
| *F16H 61/12* | (2010.01) |
| *F16H 63/42* | (2006.01) |

(52) U.S. Cl.
CPC ........... *F16H 61/24* (2013.01); *F16H 59/105* (2013.01); *F16H 61/12* (2013.01); *F16H 2061/245* (2013.01); *F16H 2061/247* (2013.01); *F16H 2063/423* (2013.01)

(58) Field of Classification Search
CPC ........ F16H 61/24; F16H 59/105; F16H 61/12; F16H 2061/247; F16H 2061/245; F16H 2063/423
See application file for complete search history.

(56) References Cited

U.S. PATENT DOCUMENTS

| 7,334,497 B2 * | 2/2008 | Giefer ..................... F16H 59/10 74/473.12 |
| 8,490,509 B2 * | 7/2013 | Giefer ..................... F16H 61/24 74/473.25 |
| 8,960,040 B2 | 2/2015 | Wang |
| 9,091,340 B2 * | 7/2015 | Wang ..................... F16H 61/24 |

(Continued)

FOREIGN PATENT DOCUMENTS

| EP | 2786048 B1 | 6/2016 |
| JP | 2002264681 A | 9/2002 |

(Continued)

*Primary Examiner* — Jake Cook
(74) *Attorney, Agent, or Firm* — Slater Matsil, LLP

(57) ABSTRACT

A jamming protection apparatus of a shift lever for a vehicle includes a shift lever rotatably provided in a housing. A contact portion is provided in the shift lever and is provided with an elastically behaving bullet. A detent portion is disposed such that the bullet of the contact portion is brought in contact with the detent portion in the housing. The detent portion is moveably seated in the housing and is provided with a grooved bottom configured such that the bullet moves over the grooved bottom when the shift lever is rotated. A behavior generator is connected to the detent portion and is configured such that the detent portion is moved by an operation of the behavior generator.

16 Claims, 3 Drawing Sheets

(56) References Cited

U.S. PATENT DOCUMENTS

| | | | |
|---|---|---|---|
| 9,529,378 B2 | 12/2016 | Jeon | |
| 10,677,344 B2 * | 6/2020 | Wang | F16H 61/24 |
| 2010/0071506 A1 * | 3/2010 | Kliemannel | F16H 61/22 |
| | | | 74/625 |
| 2011/0005344 A1 * | 1/2011 | Haevescher | F16H 61/24 |
| | | | 74/473.12 |
| 2013/0340558 A1 * | 12/2013 | Kvarnstrom | F16H 59/044 |
| | | | 74/473.33 |
| 2014/0216193 A1 | 8/2014 | Lindner et al. | |
| 2016/0306380 A1 * | 10/2016 | Buschle | G05G 5/005 |

FOREIGN PATENT DOCUMENTS

| | | |
|---|---|---|
| KR | 20090058384 A | 6/2009 |
| KR | 101232413 B1 | 2/2013 |
| KR | 20160108729 A | 9/2016 |
| WO | 2010083848 A1 | 7/2010 |

* cited by examiner

JAMMING PROTECTION APPARATUS OF SHIFT LEVER FOR VEHICLE

CROSS-REFERENCE TO RELATED APPLICATIONS

This application claims priority to Korean Patent Application No. 10-2018-0140161, filed on Nov. 14, 2018, which application is hereby incorporated herein by reference.

TECHNICAL FIELD

The present invention relates to a jamming protection apparatus of a shift lever for a vehicle.

BACKGROUND

Generally, an automatic transmission, which is mounted to a vehicle is a device that automatically and appropriately changes the gear ratio while driving in accordance with the driving condition, reduces the burden of shifting while driving, which not only improves the driving convenience but also improves the ride comfort by facilitating starting, acceleration, and deceleration.

In the automatic transmission, a shift lever is provided on the side of the driver's seat to allow the driver to perform shifting to the parking, neutral, forward and reverse travel.

A conventional shift lever device is constituted by a shift lever which is rotated in the forward and backward directions when the driver performs a shift operation, and a body to which the shift lever is rotatably hinged.

In particular, the shift lever gives a shifting feeling when moving to each gear position to fix the position of the shifted gear, while allowing the driver to check whether the gear is shifted. However, if the operability of the shift lever is not good, the shift operation of the driver may not be properly transmitted to the transmission, and an uncomfortable shifting feeling may deteriorate the commerciality of the vehicle.

Further, the shifting operation must be correctly performed to a desired gear range when the shift lever is moved, but when the shift lever is stuck or jammed due to a detent structure for giving the shifting feeling, a recognition error may occur. Such a recognition error may cause an accident due to a gear shift mal-operation caused by a failure of the gear shift to a desired gear position.

The foregoing is intended merely to aid in the understanding of the background of the present invention, and is not intended to mean that the present invention falls within the purview of the related art that is already known to those skilled in the art.

SUMMARY

Accordingly, the present invention has been made keeping in mind the above problems occurring in the related art, and the embodiments of the present invention provide a jamming protection apparatus of a shift lever for a vehicle, in which during the shift lever operation, the shift lever is prevented from being stopped at an abnormal position by being stuck or jammed. Thus, the exact stroke of the shift lever is performed such that the shifting is exactly performed to a desired gear range.

According to some aspect of the present invention, a jamming protection apparatus of a shift lever for a vehicle is provided. The apparatus includes a shift lever rotatably provided in a housing. A contact portion is provided in the shift lever and is provided with an elastically behaving bullet. A detent portion is disposed such that the bullet of the contact portion is brought in contact with the detent portion in the housing. The detent portion is moveably seated in the housing and is provided with a grooved bottom configured such that the bullet moves over the grooved bottom when the shift lever is rotated. A behavior generator is connected to the detent portion and is configured such that the detent portion is moved by an operation of the behavior generator.

The shift lever may be provided with a guide hole and the contact portion may be constituted by the bullet inserted in the guide hole to be moveable in a longitudinal direction of the guide hole, and a biasing portion provided between the guide hole and the bullet to elastically bias the bullet.

The housing may be provided with a receiving depression to allow the detent portion to be seated therein and the detent portion may be formed in a shape corresponding to a shape of the receiving depression to be seated in the receiving depression, and may be provided with the grooved bottom at an end thereof with which the bullet is brought in contact.

The behavior generator may be provided to be brought in contact with the detent portion in the housing, and may be configured to generate vibration such that the detent portion is moved in a contact direction of the bullet.

The behavior generator may be provided to be brought in contact with detent portion in the housing, and may be configured such that the detent portion is moved in a contact direction of the bullet through expansion or contraction of the behavior generator.

The jamming protection apparatus may further include a sensor configured to detect a position of the shift lever; and a controller configured to receive position information of the shift lever through the sensor, and configured such that normal state/abnormal state data according to the position of the shift lever is pre-stored therein so as to operate the behavior generator when the position of the shift lever is in the abnormal state.

The controller may determine whether elapsed time is longer than a preset time stored therein when the position of the shift lever is fixed after the shift lever is rotated, and may determine whether the position of the shift lever is in the normal state or in the abnormal state when the elapsed time is longer than the preset time.

When it is determined that the position of the shift lever is in the abnormal state, the controller may operate the behavior generator and then check whether the position of the shift lever is changed, and maintain operation of the behavior generator when the position of the shift lever is not changed.

The position of the shift lever is changed, the controller may control the behavior generator not to be operated, and may determine whether the position of the shift lever is in the normal state or in the abnormal state.

According to the jamming protection apparatus of a shift lever for a vehicle configured as described above, it is advantageous in that during the shift lever operation, the shift lever is prevented from being stopped at an abnormal position by being stuck or jammed. Thus, the exact stroke of the shift lever is performed such that the shifting is exactly performed to a desired gear range.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF ILLUSTRATIVE EMBODIMENTS

Hereinbelow, a jamming protection apparatus of a shift lever for a vehicle according to an exemplary embodiment of the present invention will be described in detail with reference to the accompanying drawings.

Figure 1:
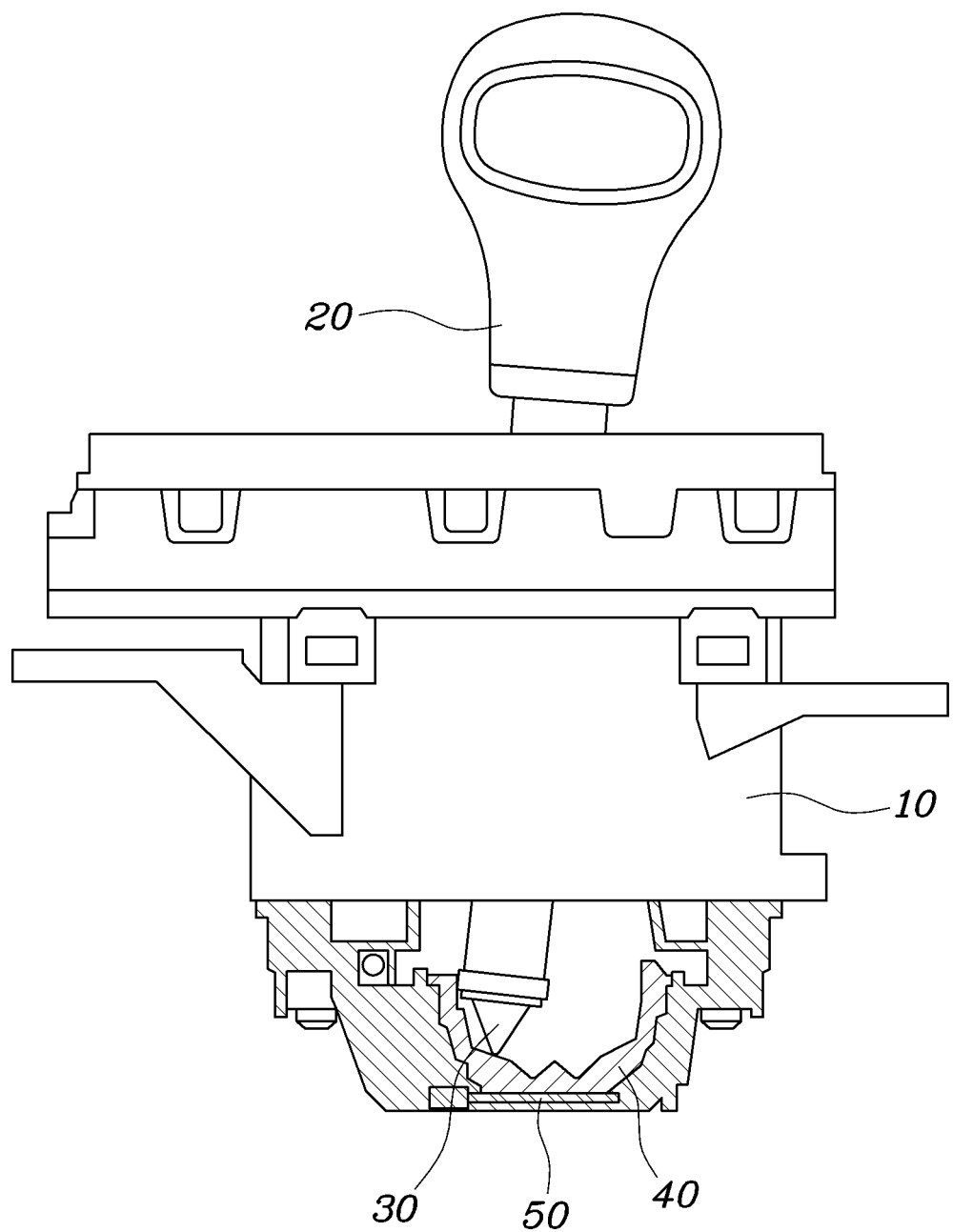
FIG. 1 is a view showing a jamming protection apparatus of a shift lever for a vehicle according to an embodiment of the present invention.
Figure 2:
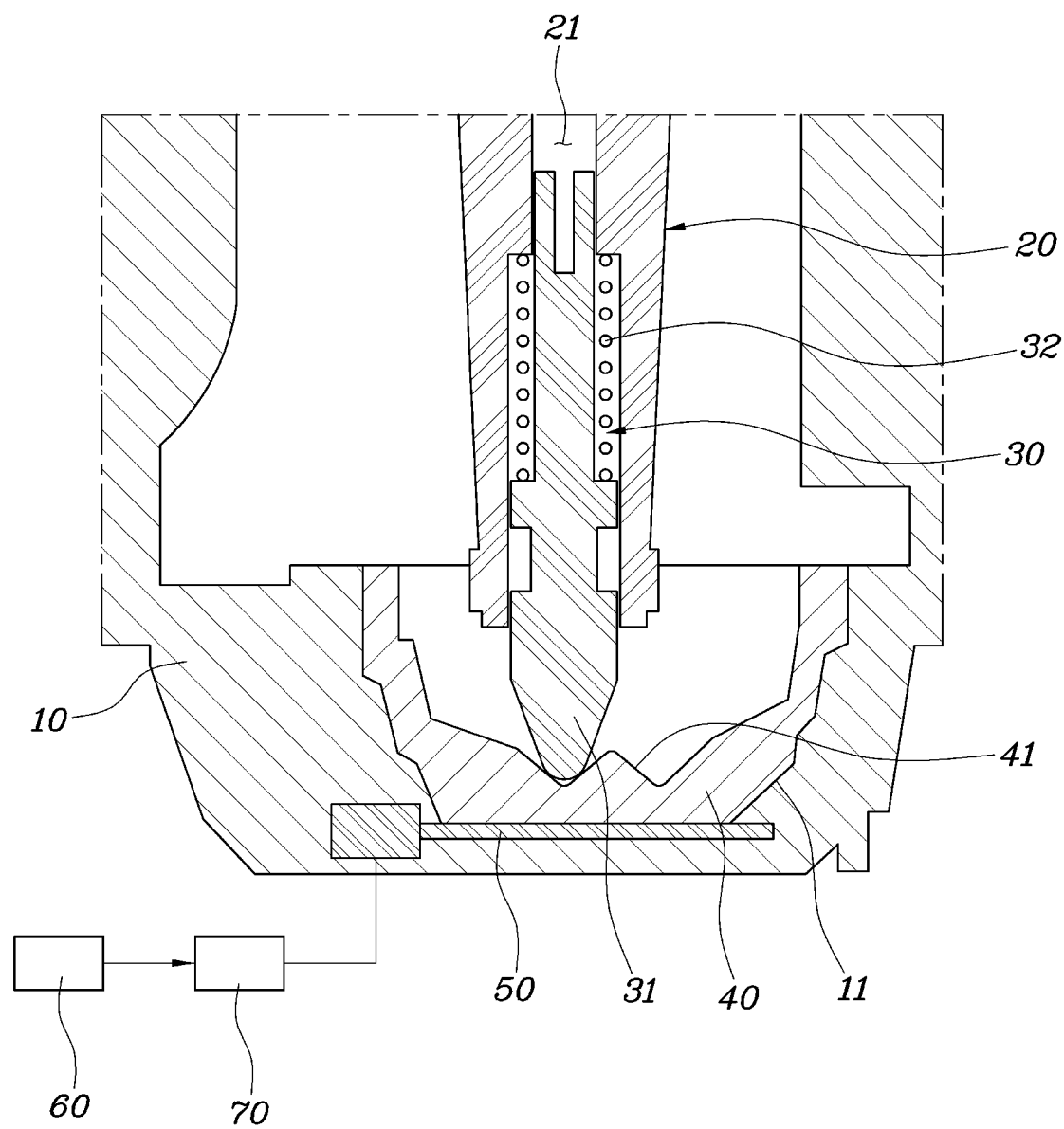
FIG. 2 is a view for explaining the jamming protection apparatus of a shift lever for a vehicle shown in FIG. 1.
Figure 3:
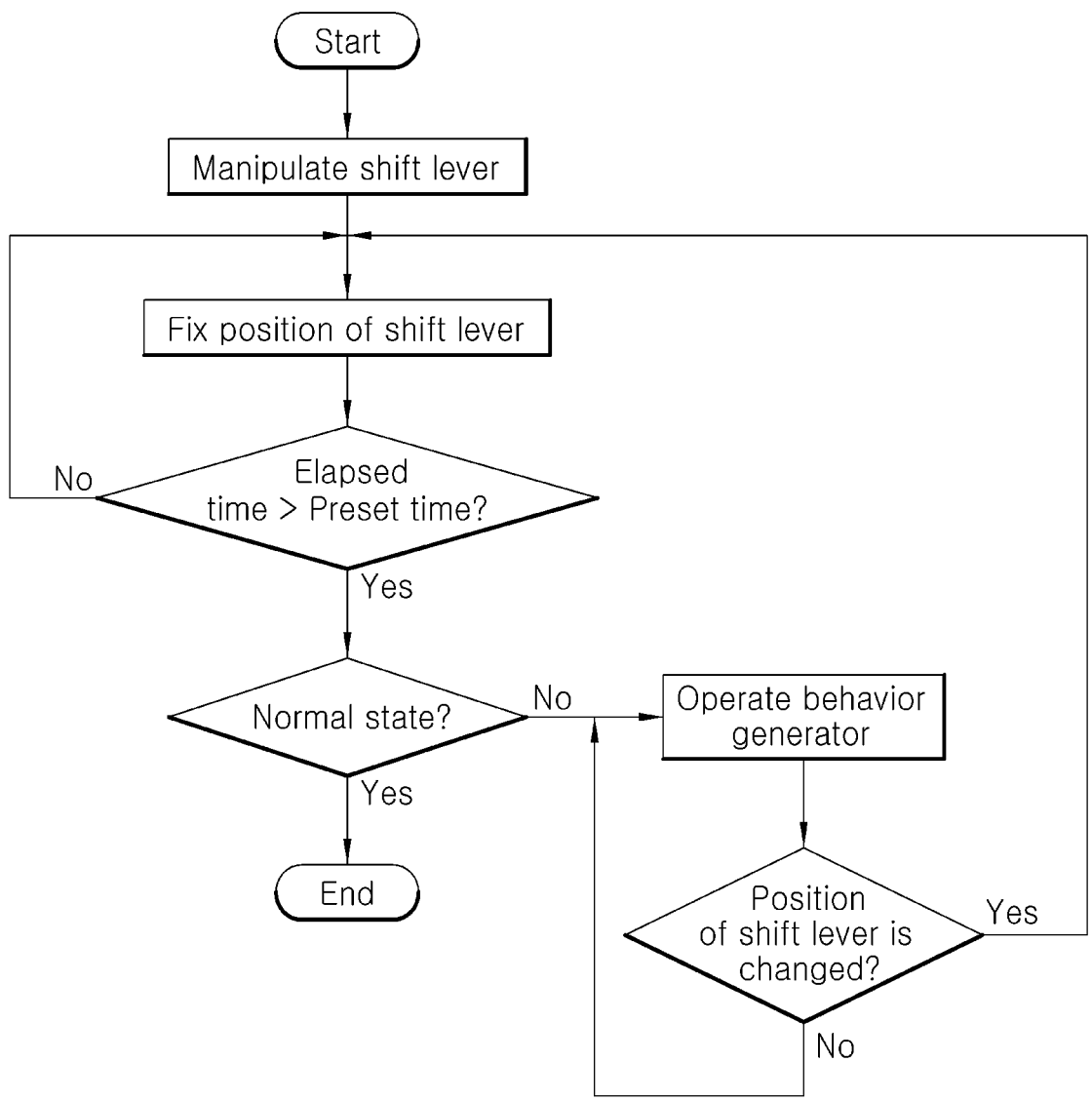
FIG. 3 is a flowchart showing the control procedure of the jamming protection apparatus of a shift lever for a vehicle shown in FIG. 1.

FIG. 1 is a view showing a jamming protection apparatus of a shift lever for a vehicle according to an embodiment of the present invention; FIG. 2 is a view for explaining the jamming protection apparatus of a shift lever for a vehicle shown in FIG. 1; and FIG. 3 is a flowchart showing the control procedure of the jamming protection apparatus of a shift lever for a vehicle shown in FIG. 1.

As shown in FIG. 1, the jamming protection apparatus of a shift lever for a vehicle according to the present invention includes a shift lever 20 rotatably provided in a housing 10; a contact portion 30 provided in the shift lever 20, and provided with an elastically behaving bullet 31; a detent portion 40 disposed such that the bullet 31 of the contact portion 30 is brought in contact with the detent portion in the housing 10, provided with a grooved bottom 41 configured such that the bullet 31 moves over the grooved bottom when the shift lever 20 is rotated, and moveably seated in the housing 10; and a behavior generator 50 connected to the detent portion 40, and configured such that the detent portion 40 is moved by an operation of the behavior generator.

As such, this embodiment of the present invention is constituted by the shift lever 20, the contact portion 30, detent portion 40, and the behavior generator 50 provided in the housing 10, and the shift lever 20 may be configured in various manners of operation. In the description of the present invention, for the sake of understanding, a lever bar type generally used is illustrated, and the present invention is applicable to various shift levers 20 such as a dial type and a wheel type as well as a lever bar type.

The contact portion 30 provided with the elastically behaving bullet 31 is installed in the shift lever 20, and inside the housing 10, there is provided the detent portion 40 formed with the grooved bottom 41, which the bullet 31 is disposed to be brought in contact with and moves over. Thus, when the shift lever 20 is rotated by manipulation thereof, the bullet 31 is moved by moving over the grooved bottom 41 of the detent portion 40, and here, the bullet 31 is elastically moved such that the bullet 31 moves over the grooved bottom 41, whereby the operating force is generated in the shift lever 20.

In particular, in the present invention, the detent portion 40 is configured to be seated in the housing 10 without being fixed thereto so as to be moveable; and the behavior generator 50 is mounted in the housing 10 to be connected to the detent portion 40 and is configured such that the detent portion 40 is moved by an operation of the behavior generator. Herein, the behavior generator 50 is provided to be brought in contact with the detent portion 40 inside the housing 10, and generates vibration such that the detent portion 40 is moved in a contact direction of the bullet 31. In other words, the behavior generator 50 may be constituted by a vibration exciter, and the detent portion 40 may be vibrated as vibration is generated in the diaphragm by a motor or solenoid operation.

Further, the behavior generator 50 is provided to be brought in contact with the detent portion 40 inside the housing 10, and may be configured such that the detent portion 40 is moved in the contact direction of the bullet 31 through expansion or contraction. In other words, the behavior generator 50 may be repeatedly expanded or contracted through air input/output such that the detent portion 40 is vibrated.

The behavior generator 50 may be applied with various means capable of generating vibration in the detent portion 40, and the detent portion 40 is moved in the direction of contact of the bullet 31 by the vibration, so that the bullet 31 and the detent portion 40 are momentarily spaced apart from each other to relieve a frictional force.

Thus, when the bullet 31 of the shift lever 20 is stuck in the grooved bottom 41 of the detent portion 40, the detent portion 40 is vibrated by the behavior generator 50 so that the static friction force between the bullet 31 and the detent portion 40 is instantaneously relieved and the shift lever 20 can be normally rotated.

To be more specific to the present invention, as shown in FIG. 2, the shift lever 20 is formed with a guide hole 21; and the contact portion 30 is constituted by the bullet 31 inserted in the guide hole 21 to be moveable in a longitudinal direction of the guide hole 21, and a biasing portion 32 provided between the guide hole 21 and the bullet 31 to elastically bias the bullet 31.

For the sake of understanding the present invention, it is assumed that the shift lever 20 is formed in a lever bar shape, and the guide hole 21 is formed in the shift lever 20, and the bullet 31 is elastically biased in the guide hole 21 through the biasing portion 32 so as to be moveable in the longitudinal direction of the guide hole 21. As a result, when the shift lever 20 is rotated, as the guide hole 21 is rotated together with the shift lever 20, the contact portion 30 is rotated, and the bullet 31 of the contact portion 30 moves over the grooved bottom 41 of the detent portion 40, thus realizing a clear and efficient gear shifting motion.

Meanwhile, as shown in FIG. 2, the housing 10 is formed with a receiving depression 11 to allow the detent portion 40 to be seated therein; and the detent portion 40 is formed in a shape corresponding to a shape of the receiving depression 11 to be seated in the receiving depression 11, and is formed with the grooved bottom 41 at an end thereof with which the bullet 31 is brought in contact.

In other words, in the present invention, the detent portion 40 is moveably provided in the housing 10 and must be moveable in the housing 10 when the behavior generator 50 is operated. Accordingly, the housing 10 is formed with the receiving depression 11 in which the detent portion 40 is seated, and as the detent portion 40 is seated in the receiving depression 11, the detent portion can be freely moved. Herein, it is preferable that the detent portion 40 is formed in a shape corresponding to the shape of the receiving depression 11 such that the detent portion 40 is moveable only toward the open portion of the receiving depression 11 in the receiving depression 11. In other words, when the shape of the detent portion 40 does not correspond to that of the receiving depression 11 or the size of the detent portion is much smaller than that of the receiving depression, the detent portion 40 may be moved by the distance between the detent portion 40 and the receiving depression 11 to cause an undesired behavior, and the detent portion 40 may collide with the receiving depression 11 to generate noise.

Accordingly, the detent portion 40 is formed in a shape corresponding to the shape of the receiving depression 11, and is seated in the receiving depression 11 to be moveable only toward the open portion of the receiving depression 11. As a result, when the behavior generator 50 is operated, the detent portion 40 is moved toward the open portion of the receiving depression 11, and as the grooved bottom 41 of the detent portion 40 is formed toward the open portion of the receiving depression 11, the friction reduction of the detent portion 40 and the bullet 31 may be efficiently performed.

The behavior generator 50 of the present invention described above may be operated through the following control and may be controlled according to the flowchart of FIG. 3.

To achieve this, as shown in FIG. 2, the jamming protection apparatus may further include: a sensor 60 configured to detect a position of the shift lever 20; and a controller 70 configured to receive position information of the shift lever 20 through the sensor 60, and configured such that normal state/abnormal state data according to the position of the shift lever 20 is pre-stored therein so as to operate the behavior generator 50 when the position of the shift lever 20 is in the abnormal state.

Herein, the sensor 60 may be constituted by a position sensor for detecting the position of the shift lever 20; and the controller 70 receives the position information of the shift lever 20 through the sensor 60, and determines the operation timing of the behavior generator 50 according to the position information of the shift lever 20.

In other words, in the controller 70, the normal state/abnormal state data according to the position of the shift lever 20 is pre-stored. Herein, the normal state stored in the controller 70 is the state where the shift lever 20 is positioned at a specific gear range such as the N-range, the D-range, and the abnormal state is the state where the shift lever 20 is in a position other than the normal state, and in this state, the bullet 31 of the contact portion 30 is jammed or stuck in the grooved bottom 41 of the detent portion 40 and is not moved to the position of the normal state.

Accordingly, the controller 70 operates the behavior generator 50 when the position of the shift lever 20 is in the abnormal state, whereby the detent portion 40 is moved by the behavior generator 50, and the bullet 31 brought in contact with the grooved bottom 41 is momentarily spaced apart from the grooved bottom by the behavior of the detent portion 40 to relieve the static friction. As a result, the shift lever 20 can get out of the stuck or jammed state, and can be rotated to be moved to the position of the normal state.

Meanwhile, the controller 70 determines whether elapsed time is longer than a preset time stored therein when the position of the shift lever 20 is fixed after the shift lever is rotated, and can determine whether the position of the shift lever 20 is in the normal state or in the abnormal state when the elapsed time is longer than the preset time. Herein, the preset time stored in the controller 70 may be set to 1 second, and at the time when a driver manipulates the shift lever 20 and the position of the shift lever 20 is fixed, if the elapsed time is longer than the preset time, the driver selects a specific gear range, and after determining the normal state or abnormal state at the corresponding position, the movement of the behavior generator 50 is controlled, whereby unnecessary behavior of the behavior generator 50 is prevented.

Meanwhile, when it is determined that the position of the shift lever 20 is in the abnormal state, the controller 70 operates the behavior generator 50 and then checks whether the position of the shift lever 20 is changed, and maintains operation of the behavior generator 50 when the position of the shift lever 20 is not changed.

In other words, when the behavior generator 50 is operated, the static friction force between the bullet 31 of the contact portion 30 and the grooved bottom 41 of the detent portion 40 is relieved, and thus, the shift lever 20 can be normally rotated. However, since the temporary frictional force between the bullet 31 and the grooved bottom 41 may not be relieved even by the temporary operation of the behavior generator 50, the controller 70 checks whether the position of the shift lever 20 is changed through the sensor 60 after operating the behavior generator 50, and maintains operation of the behavior generator 50 when the position of the shift lever 20 is not changed, thereby allowing the shift lever 20 to escape from the abnormal position.

Herein, when the position of the shift lever 20 is changed, the controller 70 controls the behavior generator 50 not to be operated, thereby preventing excessive behavior of the behavior generator 50, and determines whether the position of the shift lever 20 is in the normal state or in the abnormal state, whereby whether the shift lever 20 is jammed or stuck is determined, so that the position control of the shift lever 20 can be performed efficiently.

The jamming protection apparatus of the shift lever 20 for a vehicle configured as described above is configured such that during the shift lever 20 operation, the shift lever 20 is prevented from being stopped at an abnormal position by being stuck or jammed. Thus, the exact stroke of the shift lever 20 is performed such that the shifting is exactly performed to a desired gear range.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for use in a vehicle, the apparatus comprising:
    a shift lever rotatably provided in a housing;
    a contact portion provided in the shift lever, the contact portion provided with a bullet that is elastically movable and bullet shaped;
    a detent portion disposed such that the bullet of the contact portion is brought in contact with the detent portion in the housing, the detent portion being moveably seated in the housing and provided with a grooved bottom configured such that the bullet moves over the grooved bottom when the shift lever is rotated; and
    a behavior generator configured such that the detent portion is moved by an operation of the behavior generator,
    wherein the behavior generator is provided to be brought in contact with the detent portion in the housing and is configured such that the detent portion is moved in a contact direction of the bullet through expansion or contraction of the behavior generator.

2. The apparatus of claim 1, wherein the shift lever is provided with a guide hole and wherein the contact portion is constituted by the bullet inserted in the guide hole to be moveable in a longitudinal direction of the guide hole, and a biasing portion provided between the guide hole and the bullet to elastically bias the bullet.

3. The apparatus of claim 1, wherein the housing is provided with a receiving depression to allow the detent portion to be seated therein; and wherein the detent portion is formed in a shape corresponding to a shape of the receiving depression to be seated in the receiving depression, the detent portion being provided with the grooved bottom at an end thereof with which the bullet is brought in contact.

4. The apparatus of claim 1, wherein the behavior generator is provided to be brought in contact with the detent portion in the housing and is configured to generate vibration such that the detent portion is moved in the contact direction of the bullet.

5. The apparatus of claim 1, further comprising:
a sensor configured to detect a position of the shift lever; and
a controller configured to receive position information of the shift lever through the sensor, the controller configured such that normal state/abnormal state data according to the position of the shift lever is pre-stored therein so as to operate the behavior generator when the position of the shift lever is in the abnormal state.

6. The apparatus of claim 5, wherein the controller is configured to determine whether an elapsed time is longer than a preset time stored therein when the position of the shift lever is fixed after the shift lever is rotated, and to determine whether the position of the shift lever is in the normal state or in the abnormal state when the elapsed time is longer than the preset time.

7. The apparatus of claim 6, wherein, when it is determined that the position of the shift lever is in the abnormal state, the controller is configured to operate the behavior generator and then check whether the position of the shift lever is changed, and to maintain operation of the behavior generator when the position of the shift lever is not changed.

8. The apparatus of claim 7, wherein, when the position of the shift lever is changed, the controller is configured to control the behavior generator not to be operated, and to determine whether the position of the shift lever is in the normal state or in the abnormal state.

9. A method of operating the apparatus of claim 1, the method comprising:
detecting a position of the shift lever;
determining whether the position of the shift lever is in a normal state or an abnormal state;
when the position of the shift lever is in the normal state, causing the detent portion to move relative to the contact portion in accordance with the determined position; and
when the position of the shift lever is in the abnormal state, causing the detent portion to move relative to the contact portion in accordance with pre-stored position data.

10. The method of claim 9, wherein the position of the shift lever is detected a pre-determined time after the shift lever has been moved and wherein it is determined whether the position of the shift lever is in the normal state or in the abnormal state when the pre-determined time has elapsed.

11. The method of claim 10, further comprising determining whether the position of the shift lever is in the normal state or in the abnormal state after causing the detent portion to move relative to the contact portion in accordance with the pre-stored position data.

12. An apparatus for use in a vehicle, the apparatus comprising:
a housing with a receiving depression;
a shift lever rotatably provided in the housing, the shift lever having a guide hole and a biasing portion;
a sensor configured to detect a position of the shift lever;
a contact portion provided in the shift lever, the contact portion provided with a bullet that is inserted in the guide hole and is elastically movable and bullet shaped to be moveable in a longitudinal direction of the guide hole, wherein the biasing portion is located between the guide hole and the bullet so as to elastically bias the bullet;
a detent portion seated in the receiving depression of the housing and disposed such that the bullet of the contact portion is brought in contact with the detent portion in the housing, the detent portion being moveably seated in the housing and provided with a grooved bottom configured such that the bullet moves over the grooved bottom when the shift lever is rotated;
a behavior generator connected to the detent portion, the behavior generator configured such that the detent portion is moved by an operation of the behavior generator; and
a controller configured to receive position information of the shift lever from the sensor and to cause the behavior generator to move the detent portion in accordance with the position information.

13. The apparatus of claim 12, wherein the behavior generator is provided to be brought in contact with the detent portion in the housing and is configured to generate vibration such that the detent portion is moved in a contact direction of the bullet.

14. The apparatus of claim 12, wherein the behavior generator is provided to be brought in contact with the detent portion in the housing and is configured such that the detent portion is moved in a contact direction of the bullet through expansion or contraction of the behavior generator.

15. The apparatus of claim 12, wherein the controller is configured to determine whether the position information corresponds with a normal state or an abnormal state and to cause the behavior generator to move the detent portion when the position of the shift lever is in the abnormal state.

16. The apparatus of claim 15, wherein:
the controller is configured to determine whether an elapsed time is longer than a preset time stored therein when the position of the shift lever is fixed after the shift lever is rotated, and to determine whether the position of the shift lever is in the normal state or in the abnormal state when the elapsed time is longer than the preset time;
when it is determined that the position of the shift lever is in the abnormal state, the controller is configured to operate the behavior generator and then check whether the position of the shift lever is changed, and to maintain operation of the behavior generator when the position of the shift lever is not changed; and
when the position of the shift lever is changed, the controller is configured to control the behavior generator not to be operated, and to determine whether the position of the shift lever is in the normal state or in the abnormal state.

* * * * *